United States Patent
Tu et al.

[11] Patent Number: 6,041,022
[45] Date of Patent: Mar. 21, 2000

[54] MECHANICAL-ELECTRIC ENERGY CONVERTER AND WATCH PART COMPRISING THIS ENERGY CONVERTER

[75] Inventors: Mai Xuan Tu, Ecublens; Michel Schwab, Bienne; Jean-Pierre Musy, Begnins, all of Switzerland

[73] Assignee: Patek Philippe S.A., Plan-Les-Ouates, Switzerland

[21] Appl. No.: 09/319,988

[22] PCT Filed: Dec. 16, 1997

[86] PCT No.: PCT/IB97/01569

§ 371 Date: Jun. 15, 1999

§ 102(e) Date: Jun. 15, 1999

[87] PCT Pub. No.: WO98/27473

PCT Pub. Date: Jun. 25, 1998

[30] Foreign Application Priority Data

Dec. 18, 1996 [CH] Switzerland ............................. 3100/96

[51] Int. Cl.⁷ .................................. G04B 1/00; G04L 3/00
[52] U.S. Cl. .............................................. 368/64; 368/204
[58] Field of Search ................................ 368/64, 66, 203, 368/204; 310/75 R, 75 A, 156, 319, 328, 329

[56] References Cited

U.S. PATENT DOCUMENTS

| | | |
|---|---|---|
| 2,791,732 | 5/1957 | Jones . |
| 4,091,302 | 5/1978 | Yamashita . |
| 4,156,825 | 5/1979 | Kondo et al. ............................. 310/339 |
| 4,242,745 | 12/1980 | Mutrno ..................................... 368/73 |
| 4,644,246 | 2/1987 | Knapen .................................. 310/75 A |
| 4,853,580 | 8/1989 | Sula .......................................... 368/64 |
| 4,939,707 | 7/1990 | Magao .................................... 368/204 |
| 5,751,091 | 5/1998 | Takahashi et al. ....................... 310/319 |

FOREIGN PATENT DOCUMENTS

| | | |
|---|---|---|
| 0 695 978 | 2/1996 | European Pat. Off. . |
| 0 665 478 | 8/1997 | European Pat. Off. . |
| 92 782 | 12/1968 | France . |
| 39 03 706 | 8/1989 | Germany . |
| WO 89/06833 | 7/1989 | WIPO . |

*Primary Examiner*—Vit Miska
*Attorney, Agent, or Firm*—Young & Thompson

[57] ABSTRACT

A mechanical-electric energy converter comprising a wheel for transmitting energy which rotates at a low speed. The teeth of the driving wheel shift the rotor of the generator from its position of equilibrium, causing it to oscillate around the wheel. This converter can produce high angular velocities without a speed-increasing gear train.

13 Claims, 9 Drawing Sheets t = t1 t = t2

MECHANICAL-ELECTRIC ENERGY CONVERTER AND WATCH PART COMPRISING THIS ENERGY CONVERTER

The present invention has for its object a converter of mechanical energy into electrical energy and the timepieces using these converters.

Portable electric apparatus, as well as electronic quartz timepieces, use essentially, as an energy source, batteries or accumulators. The principal drawback of these latter is their limited lifetime. It is for this reason of interest to replace these electrical energy sources by a mechanical energy source and a converter for mechanical energy into electrical energy.

Converters for mechanical energy into electrical energy are known. European patent application 0 665 478 discloses an electronic watch comprising a toothed wheel (4) secured to an oscillating mass (8). The toothed wheel drives several rotors disposed at the periphery of a plate. In International patent application PCT 89/06833, there is described an electronic watch comprising an oscillating mass coupled with the rotor of a generator through a speed multiplying gear train.

The energy converters described in these mentioned patent applications have in common the following drawbacks:
- to obtain sufficient speed of rotation of the rotor of the generator, there must be a substantial speed multiplication, which gives rise to consumption space and increase in the cost of the converter.
- the high speed multiplying ratio introduces important friction losses, which results in decrease of the overall output of the converter.

The object of the present invention is to overcome the mentioned drawbacks by providing a new type of converter as defined in claim 1.

The invention will be better understood from a reading of the following description, with reference to the accompanying drawings, in which.

Figure 1:
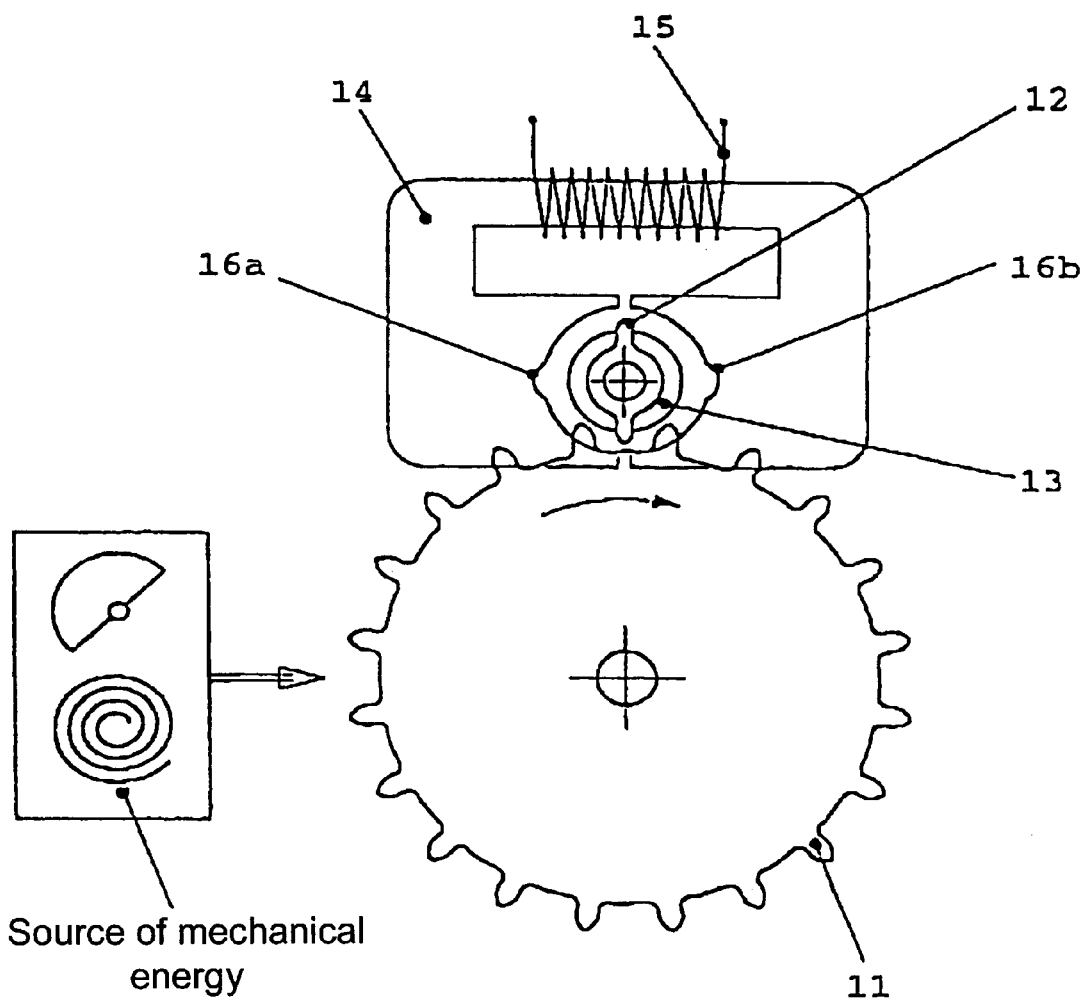
FIG. 1 shows a first example of embodiment of the converter according to the invention.
Figure 2A:
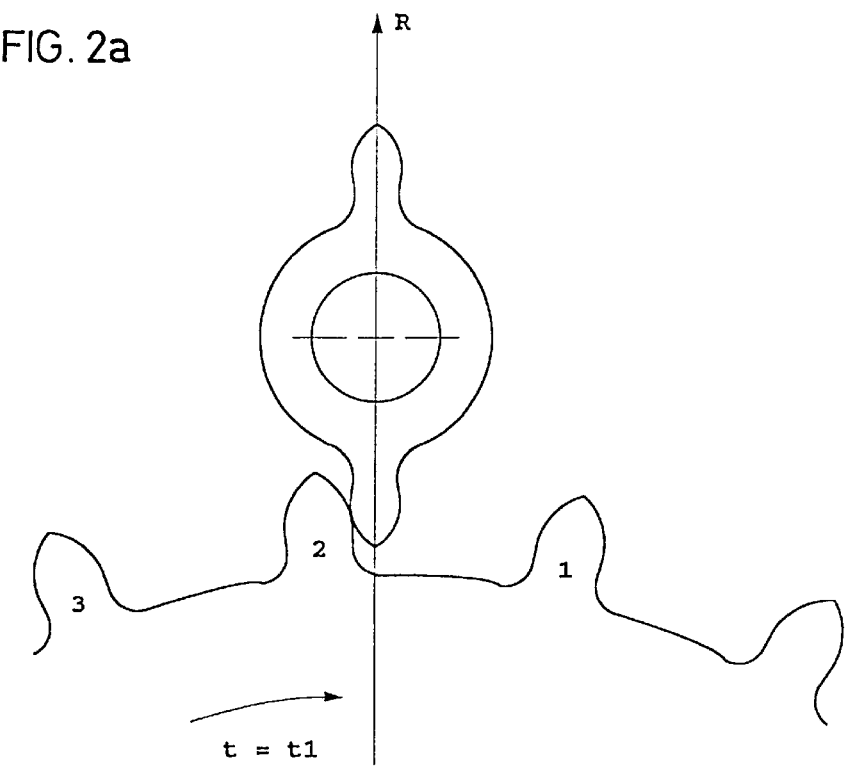
FIG. 2 shows the respective positions of the rotor of the generator of FIG. 1 as a function of those of the toothed rotor.
Figure 2B:
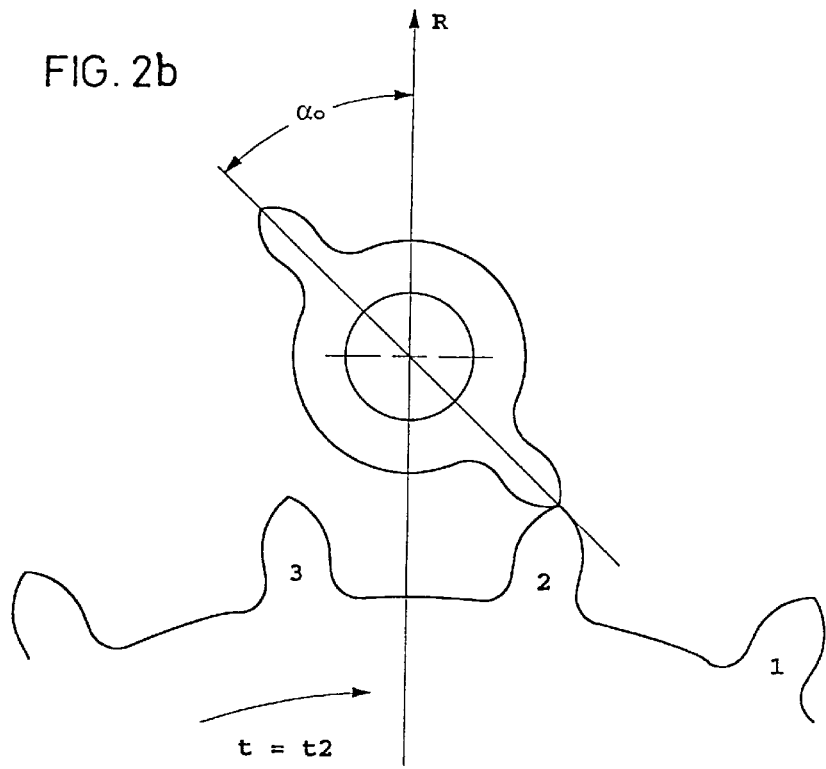
Figure 2C:
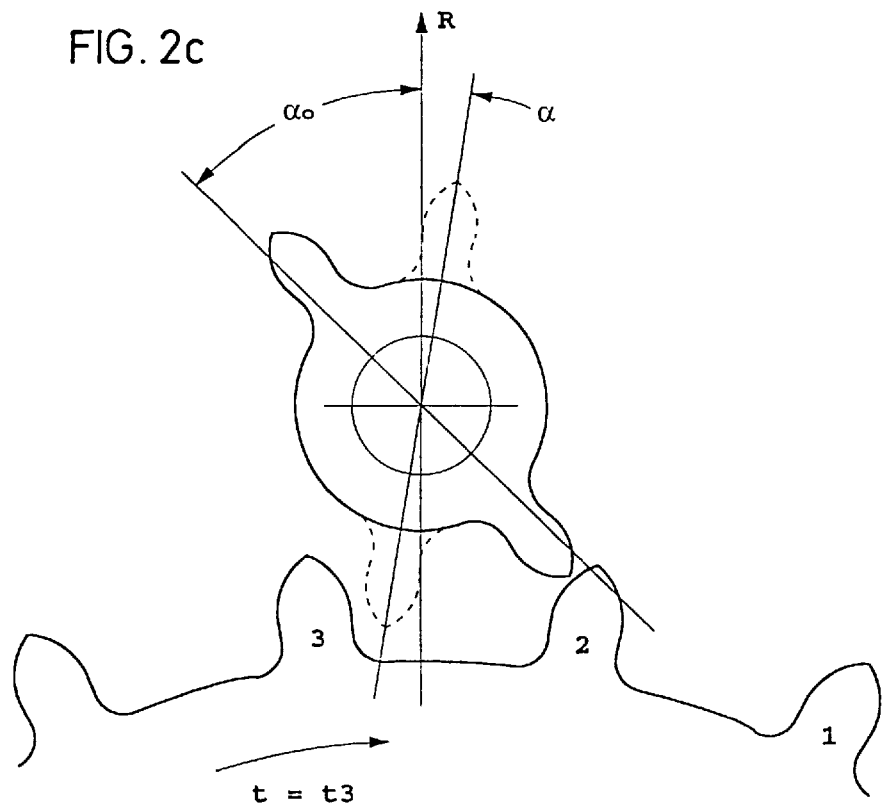
Figure 2D:
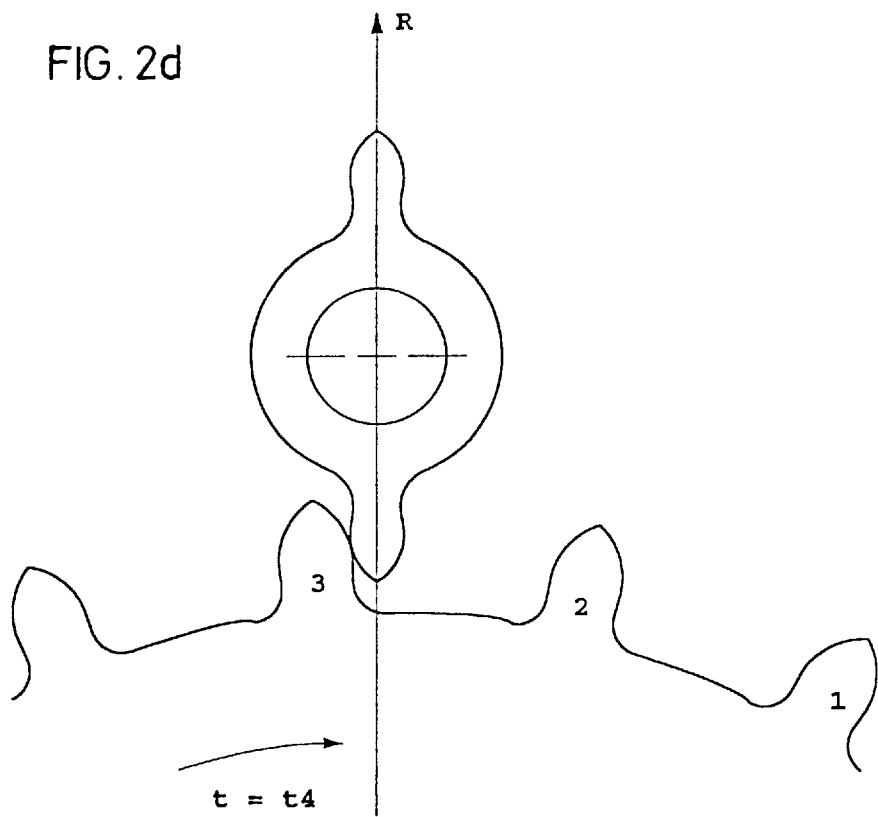

FIG. 1 shows a first embodiment of the converter according to the invention. This converter has a toothed wheel 11 turning under the influence of a mechanical energy source, either an oscillating mass, or a coil spring. The toothed wheel 11 drives the pinion 12, secured to the rotor 13, of an electromagnetic generator. This rotor, constituted by a permanent cylindrical magnet, is disposed in an air gap of substantially cylindrical shape, provided in a stator of ferronickel material. The flux generated by the rotor is coupled with the winding 15 of the generator. On the cylindrical surface of the stator air gap, there are provided two semi-circular openings 16a and 16b to give the rotor a magnetic reluctance couple.

FIG. 2 shows the respective positions of the rotor of the generator as a function of that of the toothed wheel 11. At the time t=T1, the pinion of the rotor of the generator is located between the teeth 1 and 2 of the toothed wheel, the latter exerting no couple on the rotor. The rotor, under the influence of the magnetic reluctance couple, is located on the axis R. At time t=T2, the toothed wheel 11, turning in the clockwise direction, drives the pinion of the rotor of the generator and spaces it by an angle α0 relative to its initial position. At time t=T3, the tooth 2 of the toothed rotor being no longer in engagement with the pinion of the rotor of the generator, the rotor disengages and oscillates about its rest position, which is to say the axis R, under the influence of the magnetic reluctance couple. Given the very low inertia of the rotor, this latter can attain very high angular speeds (an angular speed exceeding 600 rad/sec). The high frequency oscillating movement of the rotor permits obtaining, at the terminals of the winding 15 of the generator, a high level induced voltage.

The interest of this arrangement resides in the fact that the electrical energy supplied by the generator depends on the speed of oscillation of the rotor 13 when it is freed from the pinion 12. Because during its free oscillations of the rotor it is disengaged from the pinion 12, its speed of oscillation is a function only of its inertia and of the magnetic reluctance couple. There can thus be obtained high angular speeds of oscillation of the rotor, permitting in turn the creation by induction in the winding 15 of a high voltage, which voltage can reach several Volts whilst in present generators, a voltage only a fraction of a Volt can be achieved.

Thus, an original characteristic of the converter of mechanical energy into electrical energy, resides in the fact that the production of electrical energy is obtained when the rotor is free and not when it is mechanically engaged with an oscillating mass or a coil spring as is the case with prior designs.

When the winding 15 of the generator is connected to a load, the oscillating movement of the rotor is quickly damped under the influence of the load current. Because of this, at time t=T4, the rotor has the same relationship to the toothed wheel 11 as at time t=T1.

It will be seen that the mechanical-electrical converter according to the invention permits obtaining a high instantaneous speed of the rotor of the generator from a low mean speed of the toothed wheel and without a speed multiplying gear train. Moreover, during the mechanical-electrical conversion, the generator is subject only to its own mechanical losses, the rotor being free, which permits obtaining a high overall output.

Figure 3:
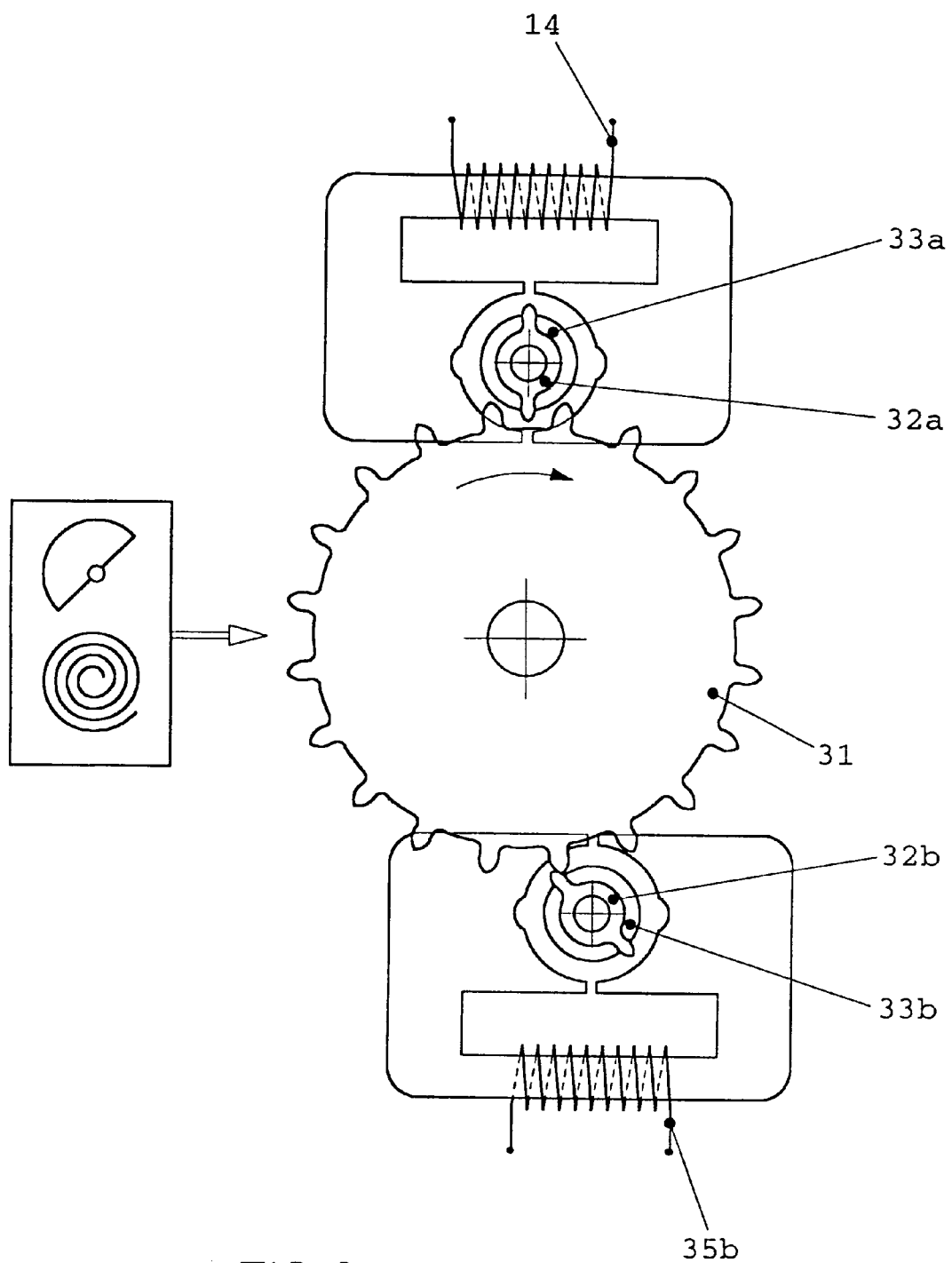
FIG. 3 shows a second embodiment of the converter according to the invention.

FIG. 3 shows a second embodiment of the converter according to the invention. In this figure, the toothed wheel 31 simultaneously engages the rotors 33a and 33b thanks to the pinions 32a, respectively 32b. The respective rest positions of the rotors are offset such that the variation of the total reaction couple on the wheel 31 will be minimal.

Figure 4:
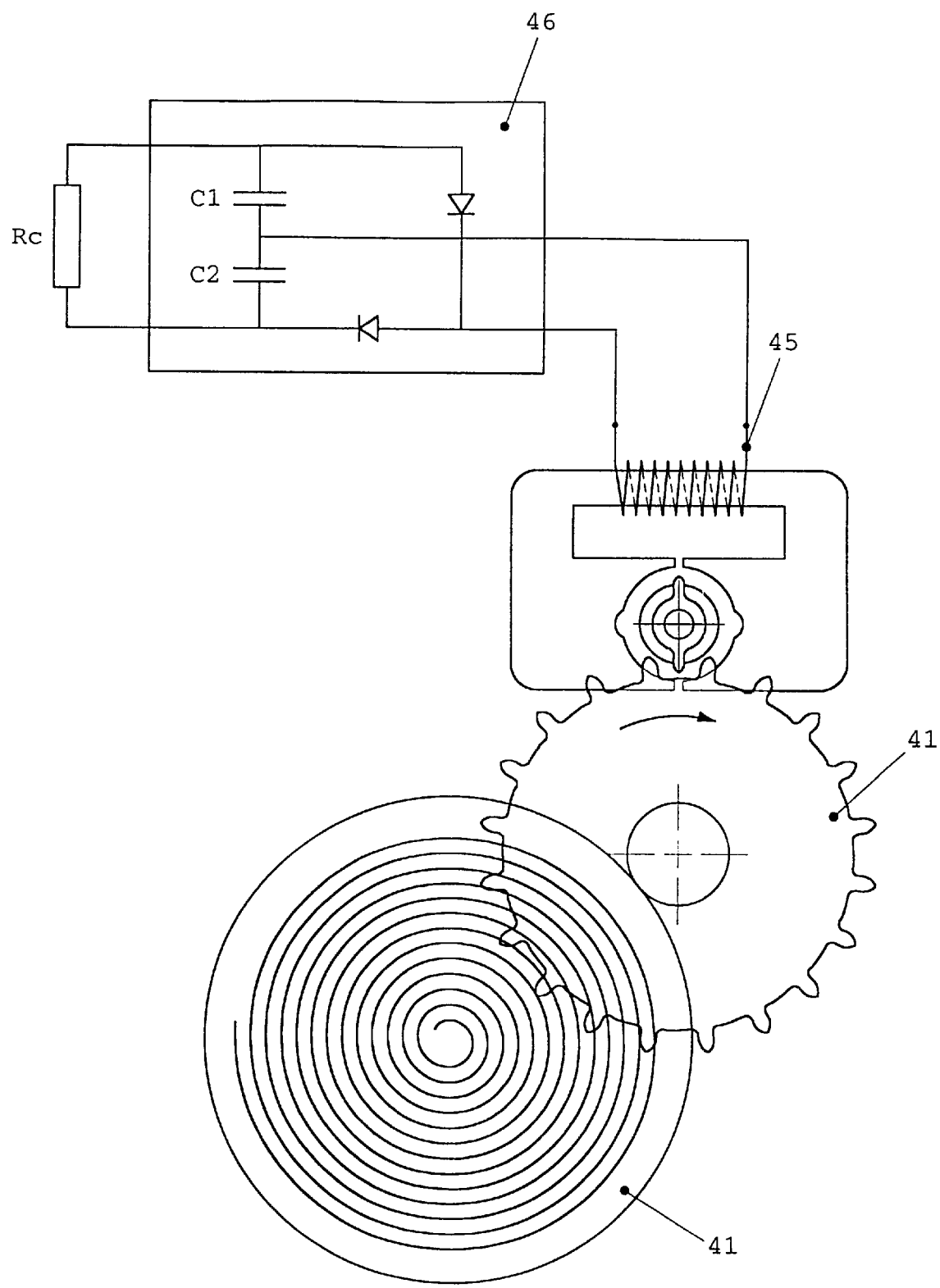
FIG. 4 shows a first example of use of the converter according to the invention.

FIG. 4 shows a first example of use of the converter according to the invention. In this example, the coil spring 40 supplies the mechanical energy to the converter through the transmission wheel 41; the voltage induced at the terminals of the winding 45 of the converter is rectified and multiplied by means of the rectifier 46. The transformed electrical energy is then stored in capacitances C1 and C2. This energy can be used by an electrical apparatus shown in the form of a load resistance Rc.

Figure 5:
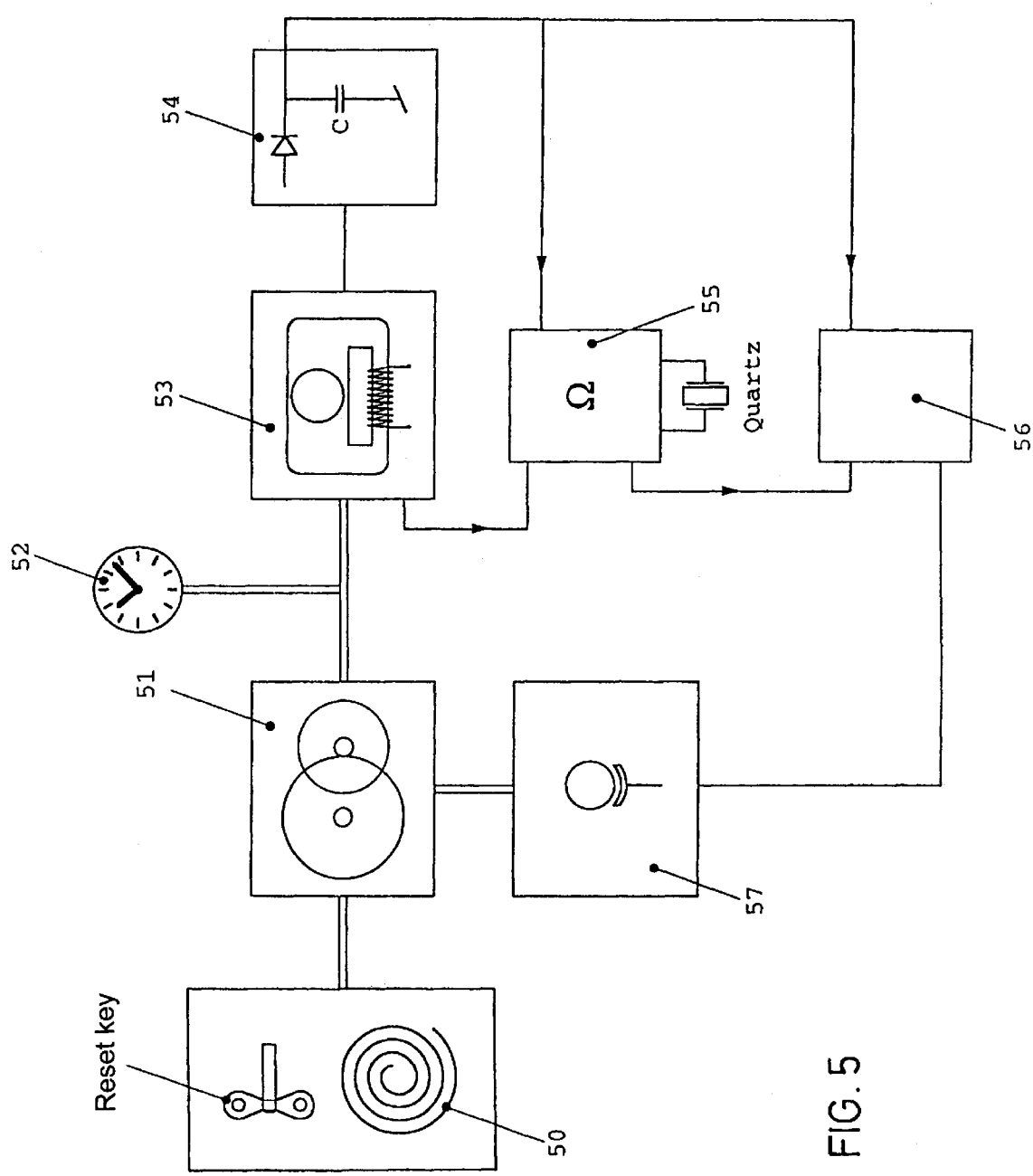
FIG. 5 shows a second embodiment of the converter according to the invention.

FIG. 5 shows a second embodiment of the converter according to the invention. It is here a case of an electronic timepiece whose energy source is of mechanical origin. The energy source 50, comprised by a coil spring, distributes the mechanical energy through wheels 51. Display means 52, generally formed by hands, are mechanically connected to the wheels 51. The wheels 51 also drive the converter 53, which supplies electrical energy to the rectifier 54, which stores this energy in the capacitance C. This stored energy serves to supply the control member 56 and speed measuring means 55. The electromagnetic brake 57, whose braking couple is adjusted by the control member 56 as a function of the mean speed of rotation of the wheels, permits adjusting this latter.

Figure 6:
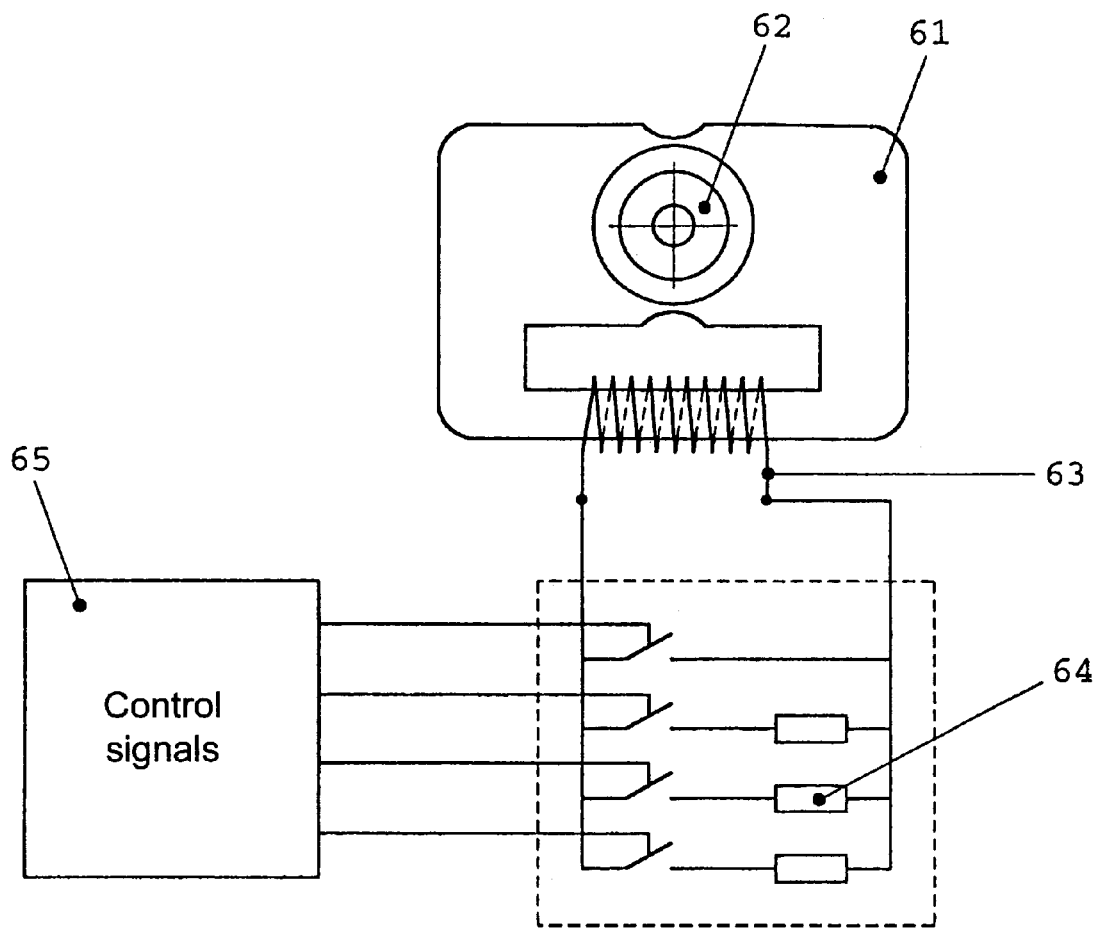
FIG. 6 shows the electromagnetic brake used in the example of FIG. 5.

FIG. 6 shows an embodiment of the electromagnetic brake. This brake is constituted by a magnetic circuit 61 of ferromagnetic material, a permanent magnet rotor 62 of cylindrical shape, a winding 63 coupled with the flux created by the rotor 62.

The terminals of the winding 63 are connected with a braking resistance network 64. The effective value of the braking resistance can be adjusted by switches controlled by control signals from the bloc 65, which permits modifying the braking couple exerted on the rotor 62.

Figure 7:
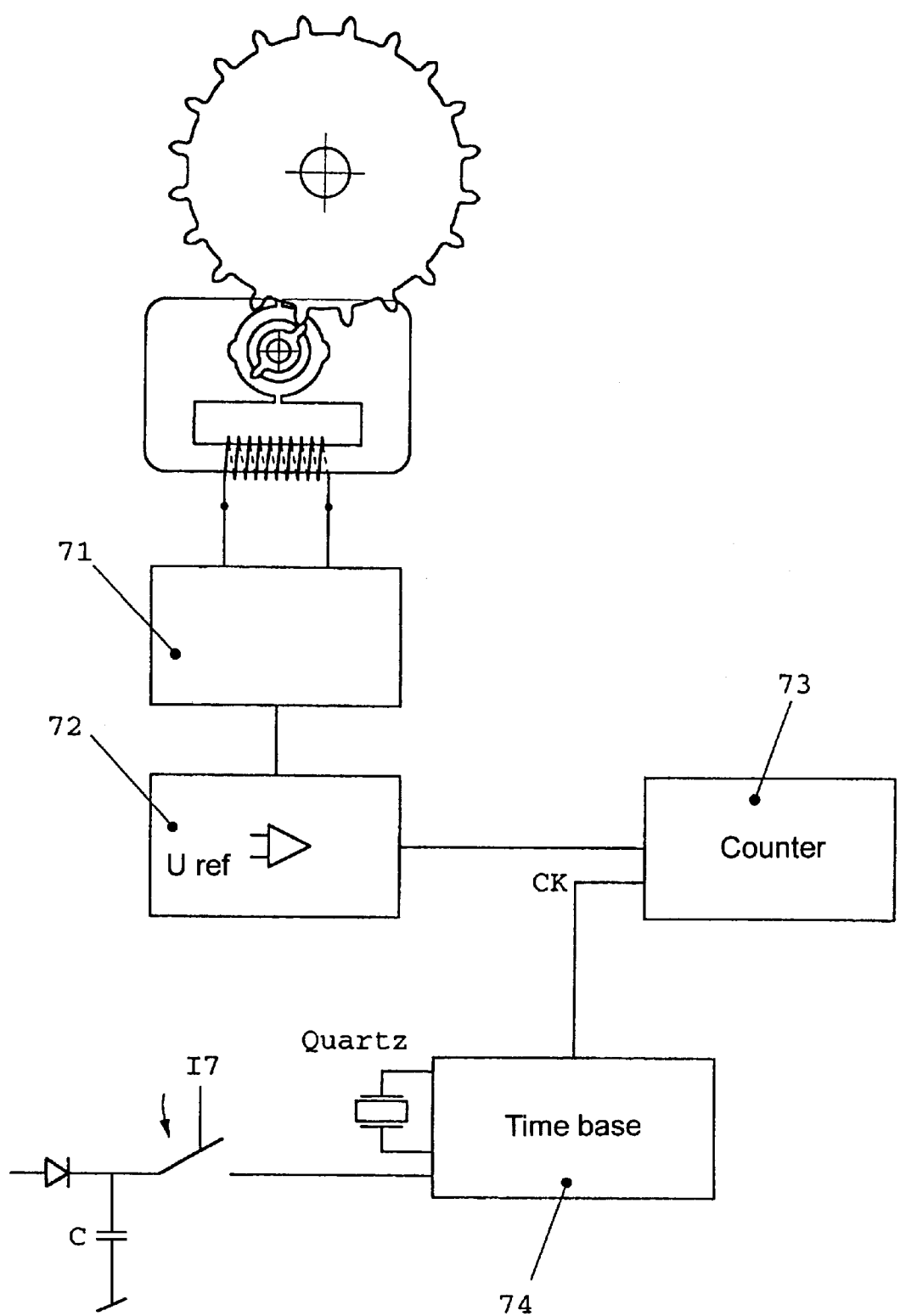
FIG. 7 shows the device for measuring the mean speed of the transmission wheels.

FIG. 7 shows an embodiment of the mean speed of rotation measuring device of the transmission wheels of the converter according to the invention. This device comprises a measuring circuit 71 of the voltage at the terminals of the generators; this voltage, varying greatly during each disengagement of the pinion of the rotor from the generator according to the associated explanations in FIGS. 2a, 2b, 2c and 2d, is supplied to the input of the comparison circuit 72 which compares it with a reference voltage Uref. The output of the circuit 72 delivers a logic signal of level 1 or 0 accordingly as the measured voltage is greater than or less than the reference voltage. This logic signal permits a counter 73 to determine the duration between two disengagements of the rotor pinion, which is to say the inverse of the mean angular speed of the transmission wheels, by counting the number of clock pulses between two successive passages of the logic signal from level 0 to level 1. The time base 74, comprising a quartz oscillator, shaping and dividing circuits, supplies the clock signal CK to the counter 73. This time base is supplied with electrical energy by the capacitance C of the bloc 54 of FIG. 5. So as to save the electrical energy stored in the capacitance C, the time base 74 is not permanently supplied but only during the phase of measuring the mean speed of rotation, the control of supply of the time base being ensured by the switch 17.

Figure 8:
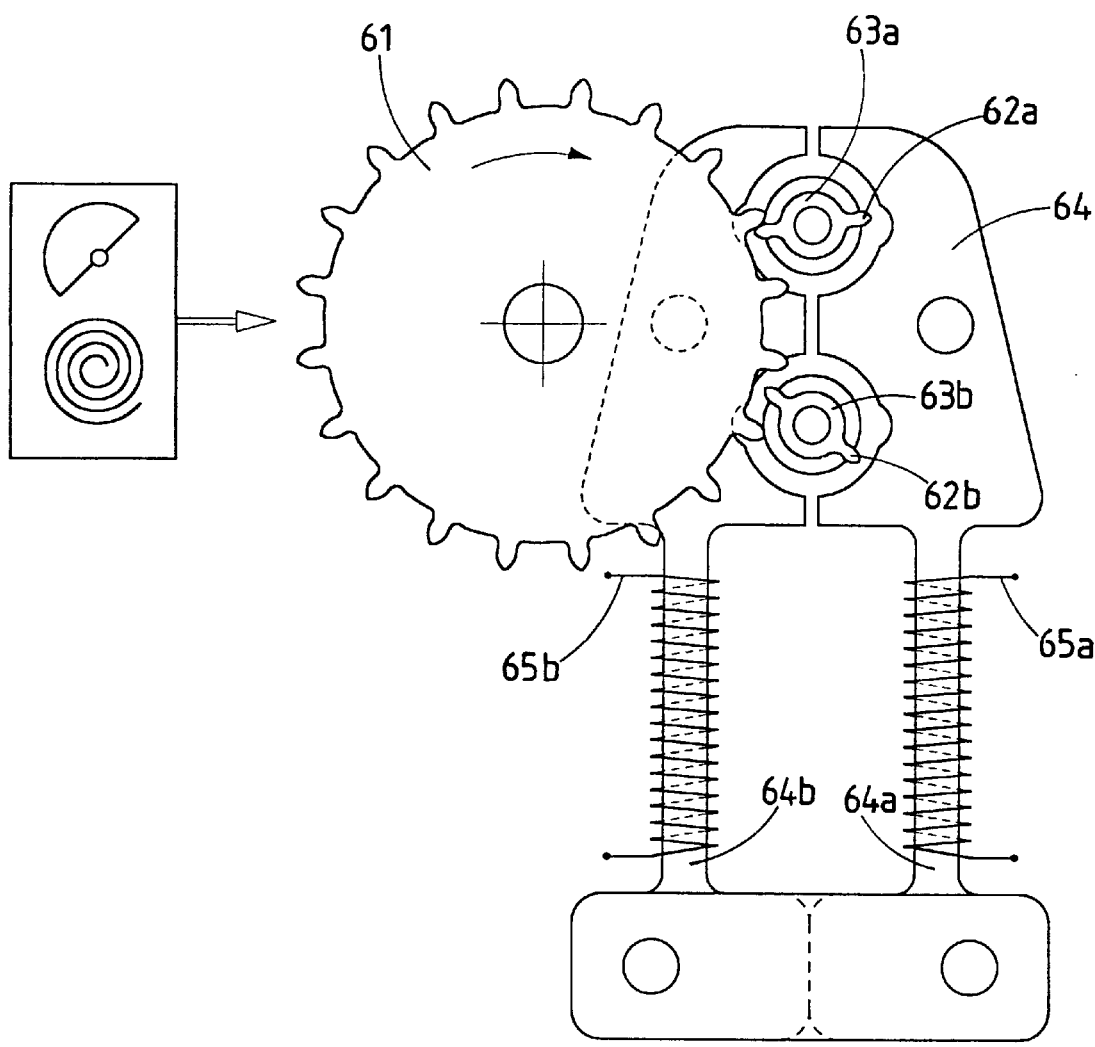
FIG. 8 shows a third embodiment of the converter according to the invention.

The third embodiment of the converter shown in FIG. 8 comprises a toothed wheel 61 driven mechanically by a coil spring or an eccentric mass and engaging with the pinions 62a, 62b of two rotors 63a, 63b disposed in a same stator 64 comprising two legs 64a, 64b about which are wound the windings 65a, 65b.

Here again, the drive of the rotor 63 by the toothed wheel 61 does not take place simultaneously, the teeth of the pinions 62a, 62b being in rest position disposed parallel but engaging with the teeth of the wheel 61 in different angular positions of this wheel.

We claim:

1. Mechanical-electrical energy converter comprising mechanical energy transmission means, comprised by at least one toothed wheel, means for transforming mechanical energy into electrical energy, comprised by at least one electromagnetic generator having at least one rotor driven by said mechanical energy transmission means, characterized by the fact that each rotor of each electromagnetic generator has a positioning couple which determines its rest equilibrium position in the absence of external couples, by the fact that the drive of the rotor or rotors by the mechanical energy transmission means is active only over a limited angle α0 of the rotor, such that the rotor or rotors cannot turn by a complete revolution, but oscillate about their rest equilibrium position.

2. Energy converter according to claim 1, characterized by the fact that it comprises means to rectify and multiply the voltage of the generator and means to store the electrical energy produced by the generator.

3. Energy converter according to claim 1, characterized by the fact that the generator is constituted by a permanent magnetic rotor, by a magnetic circuit of soft magnetic material and a winding coupled with the flux created by the magnet of the rotor.

4. Converter according to claim 1, characterized by the fact that the drive of the rotor by the mechanical energy transmission means is intermittent, these transmission means driving the rotor beyond its rest position; and by the fact that as soon as the mechanical drive connection of the rotor is interrupted, the latter returns to its rest position by oscillating about the latter at high speed under the influence of the magnetic reluctance couple of the converter.

5. Converter according to claim 4, characterized by the fact that the production of electrical energy is obtained during free oscillations of the rotor.

6. Converter according to claim 5, characterized by the fact that the toothed wheel engages with a pinion with two teeth secured to each rotor.

7. Converter according to claim 5, characterized by the fact that it comprises two generators whose rotors are driven by the same toothed wheel.

8. Converter according to claim 5, characterized by the fact that each generator comprises several rotors engaging with the same toothed wheel.

9. Electrical apparatus comprising an energy converter according to claim 1.

10. Electrical apparatus according to claim 9, constituted by a timepiece comprising a coil spring coupled with the mechanical energy transmission means of the converter, means to supply a time base, means for measuring the mean speed of rotation of the mechanical energy transmission wheels, means for regulating the mean speed of rotation of the transmission wheels, means for displaying the mean speed of the transmission wheels, characterized by the fact that said regulation means for the mean speed of rotation are constituted by an electromagnetic brake whose mean braking couple is adjusted by a control member as a function of a reference speed.

11. Electrical apparatus according to claim 10, the electromagnetic brake being constituted by a permanent magnet rotor, a magnetic circuit of soft magnetic material and a winding coupled with the flow created by the rotor magnet, characterized by the fact that the mean breaking couple is adjusted by a control member as a function of a reference speed by connecting the terminals of the brake winding to a resistance whose value is variable.

12. Electrical apparatus according to claim 10, characterized in that the means for measuring the mean speed of rotation of the transmission wheels comprise a circuit for measuring the voltage at the terminals of the generator, a circuit for comparing the measured voltage and a reference voltage supplied by a logic signal of level 1 at its output when the measured voltage exceeds the reference voltage and a logic signal of level 0 in the contrary case, a counting circuit permitting determining the time between two successive passages of the logic signal from level 0 to level 1.

13. Electrical apparatus according to claim 12, said counting signal comprising a time base, comprising a quartz oscillator and shaping and division circuits, characterized by the fact that the time base is not permanently active but only during the mean speed of rotation measuring phase of the energy transmission wheels.

* * * * *